Oct. 11, 1960  W. H. SHAPERO ET AL  2,955,643
FLEXIBLE CONTAINER TRIMMING AND SEALING MACHINE
Filed March 11, 1957  3 Sheets-Sheet 1
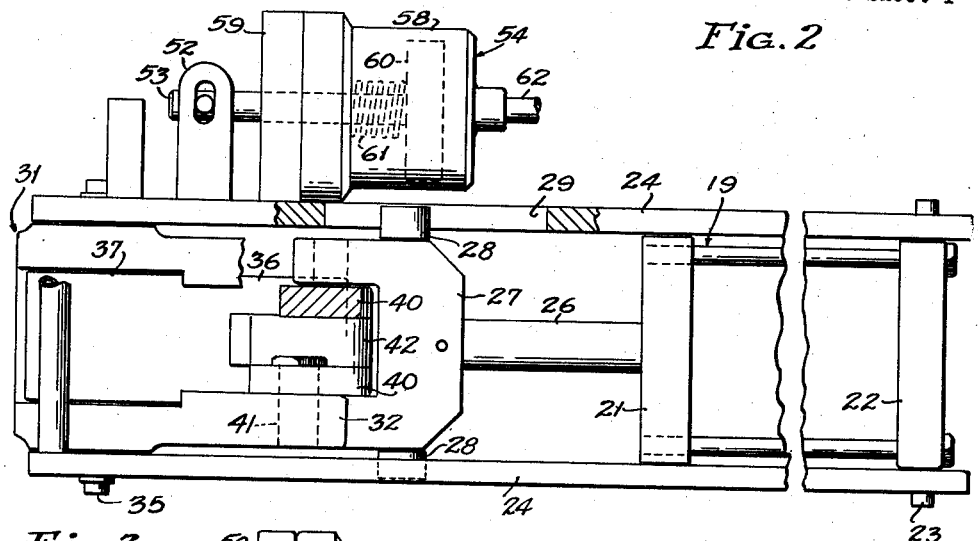
Fig.2
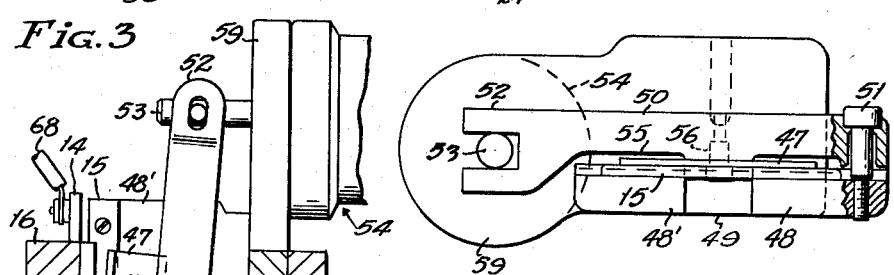
Fig.3
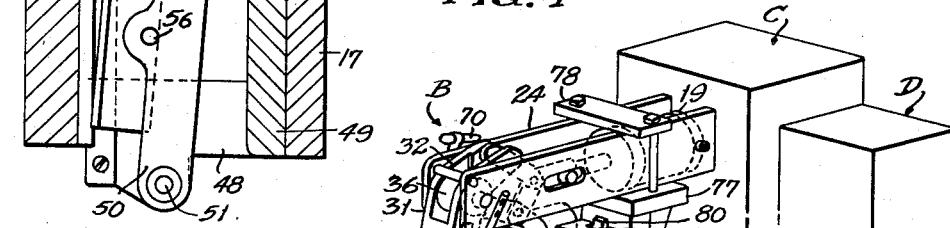
Fig.4
Fig.1
INVENTORS
WALLACE H. SHAPERO
JAMES H. WALKER
BY
Lynn H. Latta
—ATTORNEY—

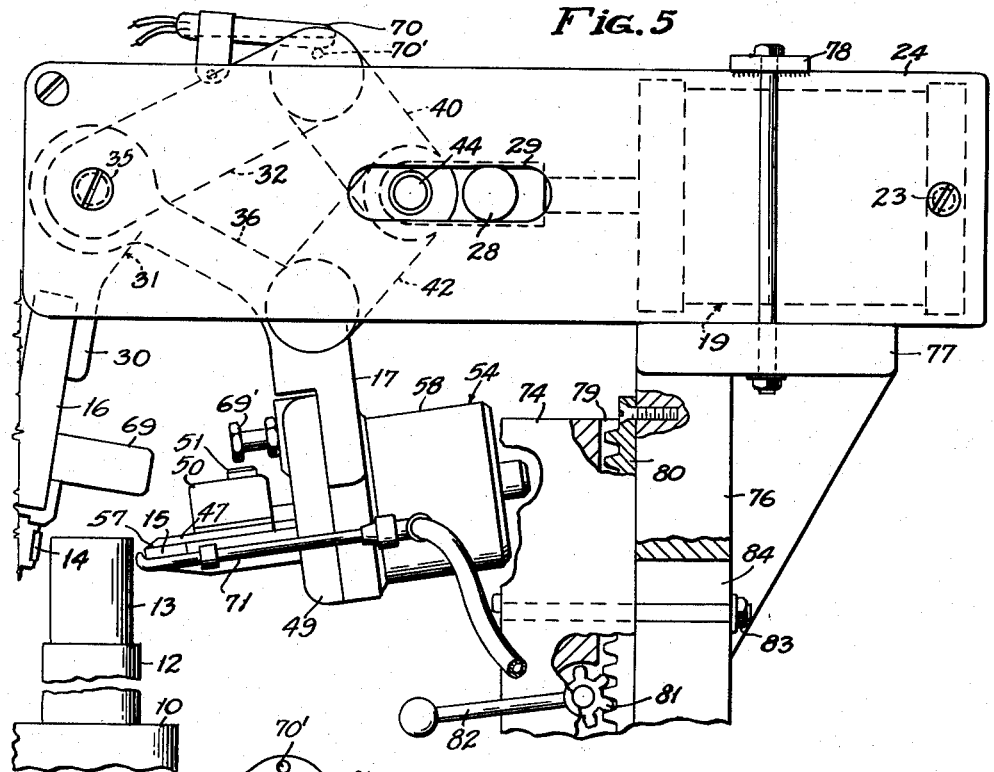

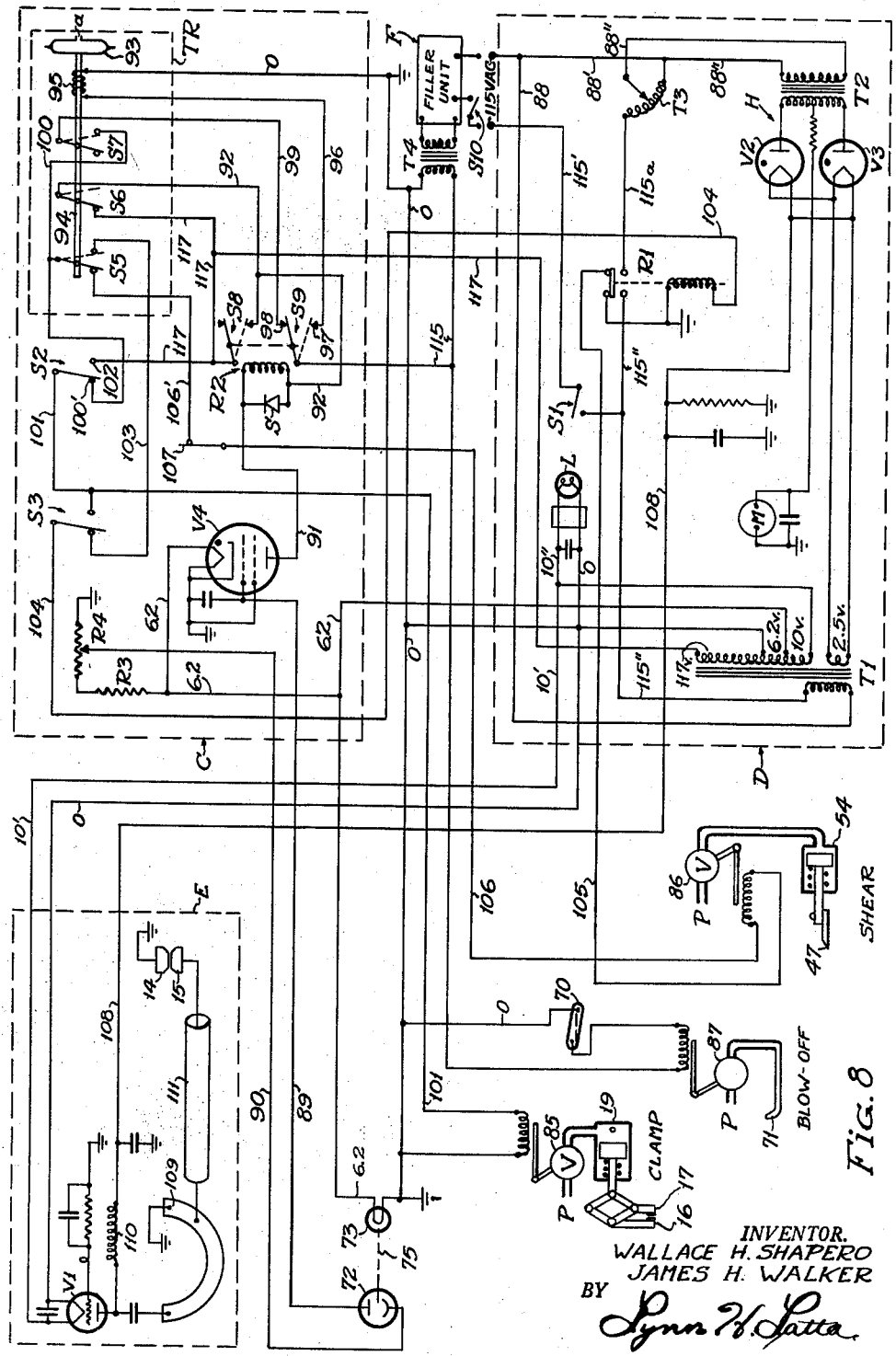

United States Patent Office 2,955,643
Patented Oct. 11, 1960

2,955,643

FLEXIBLE CONTAINER TRIMMING AND SEALING MACHINE

Wallace H. Shapero, Santa Ana, and James H. Walker, Los Angeles, Calif., assignors, by mesne assignments, to Continental Can Company, Inc., New York, N.Y., a corporation of New York Filed Mar. 11, 1957, Ser. No. 645,147

15 Claims. (Cl. 154—42)

This invention relates to the closing of tubular containers of flexible thermoplastic material and has as its general object to provide a machine adapted for closing such containers by a heat sealing method after they have been filled.

A further object is to provide such a machine adapted for successively closing a series of containers carried by a rotating turret for successive presentation between a pair of heat sealing jaws. More specifically, the invention contemplates a machine wherein a plurality of flexible tube containers, supported in vertical positions, open at the top, and carried in a circular path by an intermittently rotating turret, are automatically presented in succession between a pair of heat sealing jaws which in turn are automatically actuated to closed positions in which they squeeze into contact, opposed cheeks of the open upper ends of the containers and subject the same to heat for welding them together to provide a sealed closure seam.

A further object is to provide such a machine wherein each jaw-closing cycle is triggered by arrival of a tube between the sealing jaws (e.g. through interruption of a light beam trained upon a photo cell).

Another and important object is to provide a flexible tube closing machine adapted to form a straight closure seam at the open upper end of a filled tube and to simultaneously trim away flash material along the edge of the seam so as to provide a neat, finished end for the container.

Other objects will become apparent in the ensuing specifications and appended drawing in which:

Fig. 1 is a perspective view of a tube closing machine embodying the invention;

Fig. 2 is a plan view of the sealing jaw and actuator mechanism;

Fig. 3 is a view, partially in plan and partially in horizontal section, showing the trimming knife;

Fig. 4 is an elevational view of the knife-carrying arm and knife;

Fig. 5 is a side view of the sealing jaw and actuator mechanism with the jaws in spread positions;

Fig. 6 is a vertical section of the same with the jaws shown in the closed position;

Fig. 7 is a fragmentary view of a tube that has been closed by the apparatus of my invention; and Fig. 8 is a schematic diagram of the electrical wiring and controls.

Referring now to the drawings in detail, I have shown therein, as an illustration of one form in which the invention may be embodied, a tube sealing machine comprising, in general, a turret A for supporting a series of flexible tube containers in upright positions for intermittent rotation in a horizontal plane; together with a sealing jaw and actuator head indicated generally at B and embodying generally a pair of jaws carrying means to clamp the open upper end of a flexible tube, to apply heat thereto for forming a closure seam, and to then trim the upper end of the tube along the seam.

The turret A may comprise a circular disc 10 mounted upon and driven through a shaft 11 at its center, by any suitable intermittently operated drive motor and reduction gearing which may be of any well known type and therefore not illustrated. Attached to the disc 10 are a series of tube holder sockets 12, of cylindrical tubular form, into which the flexible tubes 13 may be inserted by an operator as the turret rotates the successive sockets in front of a loading station. After passing a filling station where they are filled, the containers 13 are transported successively to a sealing station between a pair of sealing electrodes 14 and 15. Electrodes 14, 15 (Fig. 5) are carried by respective jaws 16 and 17 adapted for spreading movement to separate the electrodes to the positions shown in Fig. 5 wherein there is defined between them a gap into which the upper end of the tube 13 may be received as shown. Jaws 16, 17 are adapted to move toward one another to close the electrodes 14, 15 against the open upper end of the tube 13 so as to flatten the same as shown in Fig. 6, thereby producing a straight flat seam 18 closing the upper end of the tube, as shown in Fig. 7.

Closing movement of the jaws 16, 17 is effected by operation of a pneumatic jaw closing actuator 19 embodying a cylinder 20 closed at its respective ends by caps 21 and 22, the latter having diametrically opposed trunnions 23 by means of which the actuator 19 is pivotally mounted between a pair of bracket arms 24 at the rear end thereof. Slidably movable in cylinder 20 is a piston 25 to which is attached a piston rod 26 extending forwardly. Piston rod 26 is provided with a wrist clevis 27 which is supported for reciprocating movement by a pair of lugs 28 secured thereto and projecting diametrically from opposite sides thereof and slidably engaged in slide way slots 29 in the respective bracket arms 24.

Jaw 16 is mounted in a yoke 30, constituting one end portion of a bell crank 31 which includes a bifurcated central portion and a pair of lever arms 32 projecting as extensions of the furcations of such central portion. The central portion is provided with a bearing bushing 33 which is journalled upon a spacer sleeve 34 clamped between the forward end of bracket arms 24 by a tie bolt 35 extending through the sleeve 34, and having its ends anchored in the respective arms 24.

Jaw 17 constitutes one end portion of an arm 36 of bell crank form having at its opposite end a knuckle 37 which has a bearing bore receiving and fitted to the bushing 33 whereby the arm 36 is mounted for swinging movement about the axis of bolt 35. Arm 36 is integrally joined to jaw 17 by a central yoke portion 38 comprising spaced bearing rings joined by a pivot pin 39.

The linkage is completed by a pair of toggle links 40 linked to the rear ends of respective lever arms 32 by pivots 41, and a third toggle link 42, the lower end of which is received in the yoke portion of arm 36 and pivotally linked thereto by a pivot pin 43 which extends therethrough and through the bearing rings 39. The upper end of link 42 is received between the lower ends of links 40 (which are laterally spaced to receive the same) and is pivoted thereto by a pivot pin 44 extending through the furcations of wrist clevis 27.

For actuating the jaws 16, 17 to closing positions, air is admitted to the chamber defined between piston 25 and cylinder cap 22, through an air line 45, attached to cap 22. Resulting forward movement of piston rod 26 and wrist clevis 27 spreads the toggle links 40, 42, which in turn transmit spreading movement to lever arms 32, 36 as indicated by the arrows thereon in Fig. 6.

with the result that jaws 16, 17 are closed as indicated by the arrows thereon in Fig. 6. When air pressure in line 45 is released, piston 25 is returned to a starting position (in which the jaws are spread as shown in Fig. 5) through the action of a compression spring 46 which encircles piston rod 26 and is engaged under compression between piston 25 and cap 21.

Electrode 15 is in a form of an elongated bar of metal of suitable electrical conductivity, preferably of rectangular cross-section, having a flat upper face which provides a slide bearing surface for a trimming knife 47. Electrode 15 is mounted upon the ends of a pair of spaced fingers 48, 48' which are formed integrally with and project forwardly from a back plate 49. Together with plate 49, fingers 48, 48' constitute an L-shaped bracket which is carried by jaw 17, the upper portion of plate 49 being secured to jaw 17 by screws or the like.

Referring now to Fig. 3, which is cut through jaws 16 and 17 so as to show the supporting fingers 48, 48' and the electrode and trimming mechanism in plan view, knife 47 is carried by a swinging lever 50 one end of which is pivoted, at 51, upon a lateral extremity of finger 48, the other end having a fork 52 which embraces the forward end portion of the piston rod 53 of a pneumatic knife actuator 54. Knife 47 is received in a shallow recess 55 (Fig. 4) in the underside of lever 50 and is pivoted to lever 50 by a pivot 56 so that the knife may automatically orient its sheering edge 57 in uniform pressure contact against electrode 14 which functions as an anvil in the trimming operation. Actuator 54 includes a cylinder 58, a piston 60 operating in cylinder 58, and a compression spring 61 for returning the piston to a starting position in which knife 47 is withdrawn from its cutting position as shown in Fig. 3. Cylinder 58 is attached to a bracket ear 59 constituting an integral lateral extension of back plate 49. Air for moving the piston 60 forwardly is supplied through a line 62 communicating with the rear end of cylinder 58.

Electrode 14 is mounted in a block 66 of insulating material which in turn is mounted to a fitting 67 attached to the lower end of jaw 16. At one end, electrode 14 has a projecting portion which carries a suitable binding post connection to an electric conductor wire 68 (Fig. 3).

Closing movement of jaws 16, 17 is limited by a stop 69 attached to jaw 16 and an adjustable stop 69' attached to jaw 17, the stops projecting toward one another in alignment and adapted to engage one another to prevent over travel of the electrodes 14, 15 (which would damage the resulting seam 18 of the container).

The trimmed off portions of seams 18 are removed by an air jet injected through a nozzle 71 carried by supporting finger 48 and supplied with air from a suitable source of compressed air P. A mercury switch 70 is pivoted to an arm 24 for tilting to a closed position in response to movement of a pin 70' carried by a toggle link 40, when jaws 16, 17 are closed.

The bracket arms of sealing head B are mounted upon pedestal 74 for vertical adjustment by means of an adjustable bracket 76 having at its upper end a table 77 to which the arms 24 are secured by a clamp 78. Pedestal 74 has in its rear face a slide channel 79 which receives a combined slide rib and rack 80 on the forward face of bracket 76. A worm 81 journalled transversely in pedestal 74 meshes with rack 80 and has a handle 82 by means of which it may be rotated to transmit vertical adjusting movement to the bracket 76. A locking bolt 83 extending through a vertical slot 84 in bracket 76, is utilized for locking the bracket 76 to pedestal 74 in any adjusted position thereof.

At this point it may be briefly stated that in the sequence of operations, at the completion of an indexing movement of turret A in which an open container is brought between the spread jaws (Fig. 5) there is automatically initiated a cycle of operation in which the jaws first close, clamp the open upper end of the container closed, apply radio-heating thereto to seal the seam 18, and immediately thereafter advances the knife 47 with a sharp quick forward movement which shears off the projecting flash of seam 18 and leaves it with a smooth straight edge.

Control and electrical mechanism

Mechanism for automatically initiating the cycle of jaw closing movement and welding and trimming operations includes a photo electric cell 72 carried by an arm 72' attached to one of the bracket arms 24, and a light beam projector 73 carried by a support pedestal 74. These units may be of conventional construction and the details thereof are therefore not illustrated. The projected light beam 75 passes through the sealing position of container 13.

Control components, in addition to the photocell 72, include a clamp valve 85 (Fig. 8) for controlling the feed of compressed air from a pressure source, indicated at P, to the clamp actuator 19; a shear valve 86, for controlling the flow of pressure fluid from the source P to the shear actuator 54; and a blow-off valve 87, for controlling the flow of air from the pressure source P to blow-off nozzle 71.

The electrical system for powering and controlling the apparatus is shown in Fig. 8.

In general, the electrical apparatus includes three units, namely, a control unit C, a power supply unit D and a high frequency generator (self excited power oscillator) E for converting the electrical power supplied by unit D into radio frequency heating current that is applied to the electrodes 14, 15 for the heat sealing operation. In addition, the controls include a linking connection to a container filling unit F, such that the automatic controls are energized through and under the control of the filling unit F, which includes a motor and suitable control mechanism (which may be conventional and is therefore not shown) for intermittently rotating the turntable A.

The primary source of power may be a standard 115 volt electric power source, indicated at 115 VAC. From this source power is supplied to filler unit F and thence through an isolation transformer T4 to a conductor 115 which supplies power for operating valves 85, 86 and 87. From source 115 VAC there is a direct connection through a trunk line 115', to an input breaker switch S1, from which it is carried by parallel connections 115" to the primary of a filament transformer T1 and to a normally open contact of a relay R1, from the other side of which a conductor 115a extends to a variable voltage transformer T3. From the transformers T1 and T3, return conductors 88 and 88' extend back to the other side of the source 115 VAC.

The output of variable transformer T3 is delivered through a circuit 88' to the primary of a transformer T2.

The transformer T1 has a multiple secondary including a 2.5 volt circuit, indicated at 2.5v. for energizing the filaments of a pair of mercury vapor diodes V2, V3 which are combined with a transformer T2 in a full-wave rectifier H which provides direct current power to self oscillator E. A 6.2 volt circuit, indicated at 6.2v., extends to conductors 6.2, for supplying current to the lamp unit 73, to a control rheostat R3, R4, and to the filament of a thyratron tube V4 of the control unit C. A 10 volt circuit, indicated at 10v., extends to parallel connections 10' and 10" to the filament of a high amperage triode V1 in the generator E and to an indicator lamp L in power unit D, respectively.

A zero potential connection to transformer T1 is connected to ground conductors, indicated at O, which constitute one side of a 117 volt circuit, indicated at 117v., from which parallel conductors 117 extend into the control unit C.

The thyratron tube V4 is controlled by photocell 72, which is connected to the control grid of the tube V4 by a conductor 89 and to the slider of the adjustment potentiometer R3, R4 by a conductor 90. By adjustment of potentiometer R3, R4, the bias on the grid may be varied so that the tube V4 will be nonconducting when the light beam 75 is broken, and will become conducting when the light beam impinges upon the photocell. The output from the plate of tube V4 is carried by a conductor 91 to the solenoid of a relay R2, for actuating the same when the tube V4 is conducting. A selenium rectifier S is shunted across the solenoid, and the other side of the solenoid is connected by parallel connections 92 to (a) a normally open contact of a switch S8 of relay R2 and (b) the movable contact of a switch S6. The other sides of switches S8 and S6 respectively are connected to the 117 volt energizing circuit through branch connections 117.

Switch S6 constitutes one of three switches in a pneumatic timer relay of a type known as an Agastat, indicated generally at T4. Relay TR includes a pneumatic element 93 (shown schematically as a bellows) having a restricted orifice a which controls the timed action of the relay. It includes an armature 94 which, when not subject to a magnetic field, is permitted to move slowly under the control of pneumatic element 93 and in response to the action of a spring (e.g. the spring metal wall of bellows 93). Relay TR also includes a solenoid 95 for moving the armature in opposition to the spring action of pneumatic element 93. Armature 94 is linked to the movable contacts of switches S5, S6 and S7, for moving them in unison, the switches being adapted and adjusted for reversing sequentially during the timed spring-urged movement of the armature, in the following sequence: S5, S6, S7.

One side of solenoid 95 is connected to ground connection O as indicated and the other side is normally connected to the 115 volt conductor 115 through a connection 96 to a contact 97 of a double throw switch S9 of relay R2 on which contact the movable contact of switch S9 is closed when relay R2 is energized. Such movable contact is connected to power line 115. The energized position of relay R2 is shown in dotted lines. The energization of Agastat solenoid 95 holds the Agastat in a "cocked" condition, with the switches S5, S6 and S7 reversed from their positions shown in full lines to their positions shown in dotted lines; and the timing cycle in which the tube is sealed and then trimmed, is started by breaking the circuit to Agastat solenoid 95 and allowing the Agastat to effect the timed sequential reversal of switches S5, S6, S7 back to their positions shown in full lines under the control of orifice a.

Double throw switch S9 of relay R2 has a second fixed contact 98 which is connected through a conductor 99 to the movable contact of Agastat switch S7. The fixed contact of switch S7 is connected, through a conductor 100, to a fixed contact 100' of a double-throw manual switch S2, the movable contact of which is connected through a conductor 101 to the actuator solenoid of clamp valve 85. When closed on contact 100', switch S2 sets up the automatic actuator circuit for clamp valve 85. When closed on an alternate contact 102, switch S2 provides a direct connection to valve 85 from power line 117 for manual actuation, cutting out the Agastat TR.

Conductor 100 also provides a connection from switch S7 to the movable contact of Agastat switch S5, which is a double-throw switch. From one side of switch S5, a conductor 103 extends to one side of a double-throw manual switch S3, the movable contact of which is connected through a conductor 104 to the energizing coil of relay R1, for energizing the same when switch S5 is moved to its dotted line position. This results in reversal of relay R1 from its position shown, to its alternate position, for energizing oscillator E through rectifier H. The other side of switch S3 is connected to the conductor 101, so that the relay R1 can be manually actuated by reversal of switch S3.

In the normally closed position of relay R1, shown in Fig. 8, it places ground on a conductor 105 which is connected to one side of the solenoid of the shear valve 86, the other side of this solenoid being connected through a conductor 106, to a manually operable shear cut-out switch 107 and a conductor 106' to the normally closed contact of switch S5. Thus, in its deenergized position, relay R1 establishes one connection in the circuit for energizing the shear valve 86 to effect the shearing operation which occurs when the switch S5 arrives at its normally closed position shown in full line.

The solenoid of blow-off valve 87 is connected directly between the power line 115 and the ground conductor O with only the mercury valve 70 interposed for controlling the valve. Thus the blow-off operation commences approximately at the time the tube is clamped between jaws 16, 17, a delay being involved in the operation of the mercury switch, after the jaw closing operation has commenced, so that the projecting upper end of the container will be engaged between the jaws prior to its being subjected to the air jet, thus avoiding being dislocated. However, the jet is energized slightly prior to the shearing operation and functions to cool the jaws (thus accelerating the hardening of the seam 18) and continues until shortly after the shearing operation is completed, so as to blow away the trimmed off flash.

The oscillator E is a conventional unit, utilizing the direct current output of rectifier H, transmitted through a conductor 108 and fed into a high capacity inductance unit 109 by induction from an inductor coil 110, to produce a rapid succession of pulses at the frequency (e.g. 75 megacycles per second) of natural oscillation of the tuned circuit which includes inductance 109, inductor 110 and the tube V1 acting as a valve or exciter which has its grid controlled through its resonant circuit shown. The output of the inductance 109 is delivered through a coaxial conductor 111 to the live electrode 15 of the sealing unit, whereby the sealing is effected by a rapid succession or "burst" of radio frequency pulses projected across the gap between the electrodes.

*Operation*

Prefacing a description of operation, it may be noted that the closing of breaker switch S1 immediately energizes the primary of transformer T1, but the power is initially cut off from the full wave rectifier H and oscillator E at the open side of relay R1 in its normal position shown. The Agastat relay TR and the solenoids of clamp valve 85 and blow off valve 87 are cut off from power until the filler unit F is turned on (e.g. by manually operable switch S10). The energizing of transformer T1, however, immediately energizes the exciter lamp 73 and the resultant light beam 75 (assuming it to be uninterrupted) energizes photo cell 72 to shift thyratron V4 to the conducting state, thus energizing relay R2 and shifting the switches S8 and S9 thereof to their alternate positions shown in dotted lines. This closes the circuit of Agastat solenoid 95 at the contact 97 of switch S9 causing the Agastat to shift to its dotted line position, in which it is "cocked" for its timing operation which is initiated when light beam 75 is interrupted by the arrival of an open container at the sealing position between jaws 16, 17.

The cocking of Agastat TR has closed switch S5 thereof in circuit 103, S3, 104 which energizes relay R1, reversing it from its position shown to its position in which it closes the circuit through conductor 115a to variable transformer T3, which energizes full wave rectifier H and generator E so that radio heating will take place as soon as a tube is clamped between the electrodes 14, 15. At the same time, the shear valve circuit 106 has been opened at switch S5 to maintain the shear inoperative until switch S5 has returned to its normal position shown in full lines. Also, swtich S7 has been closed to partially establish a circuit 99, 100, 101, to the solenoid of clamp valve 85 (which circuit temporarily remains open at switch S9). As a further result of the energized reversal of relay R2, switch S8 is closed to maintain connection from power line 117 through connection 92 to relay R2 (for maintaining power on thyratron V4) while the parallel connection to this circuit is opened at switch S6. By thus maintaining the power on relay R2, the Agastat is kept cocked until the sealing operation begins. Upon the subsequent opening of switch S8 (when light beam 75 is interrupted, as hereinafter described) while switch S6 remains open, power is taken off the thyratron V4 to prevent recocking which might occur through arcing with a consequent production of light that could affect the photo cell 72.

In the operation of filler unit F an open tube will be brought into sealing position, interrupting light beam 75, deenergizing photo cell 72, shifting thyratron tube V4 to the non-conducting state, denergizing relay R2 and causing it to reverse back to its full line position. Thereupon, the circuit of Agastat solenoid 95 is opened at switch S9 and its armature is released for timed movement sequential operation. In the timed return movement, the switches S5, S6 and S7 are reversed sequentially, switch S5 completing its reversal to full line position before switch S6 closes and before switch S7 opens. Switches S6 and S7 may complete their reversal simultaneously.

Simultaneously with the start of the timed return movement of Agastat TR, the closing of switch S9 of relay R2 on its contact 98 (while Agastat switch S7 remains closed) completes the circuit 115, 98, 99, 100, 101 to the solenoid of clamp valve 85, energizing the same, opening the valve and delivering air under pressure to actuator 19, thus closing the jaws 16 and 17 upon the open end of the tube. As the jaws come together, the electrodes 14, 15 (energized as described above) will effect the heat sealing operation, forming seam 18.

As the jaws 16, 17, come together, mercury switch 70 is tilted to closed position, energizing the solenoid of blow-off valve 87 and opening the valve to deliver an air jet through nozzle 71, which cools the jaws to solidify the seam 18.

Shortly thereafter, switch S5 opens relay circuit 103, 104, deenergizing relay R1, causing it to reverse back to its position shown, and thus cutting off the heat sealing current, while simultaneously setting up the circuit to shear valve 86 which is shortly thereafter completed by the closing of Agastat switch S5 in its full line position.

Switch S7 is sufficiently delayed in its reversal so as to remain in its dotted line position for a short interval after switch S5 has closed the circuit to shear valve 86, which circuit extends from power line 115 through switch S9 at contact 98, conductor 99, switch S7, conductor 100, switch S5, and conductors 106', 106. Thus the solenoid of valve 86 is momentarily energized, opening the valve 86, directing air under pressure into actuator 54, and causing shear blade 47 to advance to shearing position. As soon as the shearing operation has been effected, Agastat switch S7 opens, causing the valve 86 to reverse back to its closed position and the shear 47 to be withdrawn. At the same time, switch S6 closes, to restore power to relay R2.

Up to the point where switch S7 opens, it has maintained the circuit to the clamp valve 85, maintaining jaws 16, 17 closed for the shearing operation. The opening of switch S7 causes the jaws to open and the mercury switch 70 to be tilted back to its open position, thus causing the valve 87 to reverse to its closed position, cutting off the air jet.

The timing of the filler unit F is such as to start a new indexing movement of turret A after the foregoing cycle of sealing and trimming operations has been completed, thus moving the sealed container out of the path of light beam 75, reenergizing photo cell 72, causing thyratron V4 to again become conducting, again reversing relay R2 to its dotted line position, and starting a new cycle of operation beginning with setting of Agastat TR back to its dotted line position.

Thyratron V4, sensitive to the weak signal delivered by photocell 72, and functioning, in response thereto, to deliver current of amplified strength sufficient to actuate relay R2, may be regarded broadly as an amplifier, and more specifically (by reason of its on and off switching type of operation) as a high sensitivity relay or switching amplifier, and these terms, as used in the appended claims, are intended to designate the tube V4 or its equivalent. Relay R2, being interposed between the several parts of the Agastat TR and actuator components, may be identified as a linking relay and is so designated in the appended claims.

Relay R1, having the several functions of cutting off power from the generator E to terminate the heat-sealing operation and initiating the operation of shear 47, which is the terminal stage of the timed cycle of operation, is referred to in the appended claims as a terminal relay, to suggest those functions.

The term "trigger element" is used to designate the photocell, or any equivalent responding to the indexing movements of turret A, to initiate successive cycles of operation.

Switch S5, which on one side controls the shearing operation, is referred to in the claims as a shear control switch. Switch S7, which controls the clamping operation, is referred to as a jaw control switch. Switch S6, which restores power to relay R2 at the end of the timed operation, is designated a limit switch.

Manual switches S2 and S3 are shown in their normal positions, in which the circuits are set for automatic operation. When moved to its alternate position, switch S2 connects the clamping circuit 101 to power line 117, for immediate actuation of jaws 16, 17.

When both these switches are shifted to their alternate positions, switch S3 connects relay R1 to power line 117, to energize the generator E for the sealing operation.

Although the invention has been developed especially for the sealing of containers of thermoplastic synthetic resin materials such as vinyl chloride, it is to be understood that it may be utilized in the sealing of any container, or the closing of an end of any tubular member of any material that is subject to being welded by radio heating, and the term "thermoplastic," as used in the appended claims, is not intended to be restricted to synthetic resin materials, but should be understood as having a broad meaning, embracing all materials that can be welded through such heat softening.

We claim:

1. Apparatus for sealing tubular containers of flexible thermoplastic material, comprising: means for supporting a series of filled containers on respective vertical axes with open ends projecting upwardly, and for moving said containers horizontally from a filling station to a sealing station; a sealing head having clamping jaws movable from horizontally spaced open to closed positions in a direction transverse to the path of container transporting movement, said jaws in said open position being in straddling relation to said open end of the container as positioned at the sealing station; for clamping between them the open end of a container and closing the same; means carried by said jaws for developing heat between said jaws in said container end as thus closed, for heat sealing said end to provide a closure seam; means for successively presenting a series of open containers to a sealing station between said jaws; a trimming knife carried by one of said jaws in a position to engage said seam against the other jaw and to trim away the flash margin of said seam; actuators for closing said jaws and for advancing said knife respectively; a terminal relay having a normally closed position in which it sets up a circuit for energizing said knife actuator and opens a circuit to said heat sealing means, and having an alternate closed position, assumed when it is energized, in which it establishes said heat sealing circuit; a timer embodying electromagnetic means to set it in a starting position, delayed operating means for returning it to a normal position in a timed operation upon deenergization of said electro-magnetic means, a jaw control switch adapted, in said starting position, to establish connection in a circuit to said jaw closing actuator for closing the jaws, and a double throw knife control switch adapted, in said starting position, to effect the energization of said terminal relay to initiate a heating operation and adapted, in the timed movement of said timer relay, to open the circuit to said terminal relay for deenergizing the latter and causing it to revert to its normally closed position to interrupt the heating operation, said knife control switch having a normally closed position, attained during said timed operation, in which it completes the circuit to said trimming actuator for effecting the knife operation; and means responsive to operation of said trigger element upon arrival of a container at said sealing station, for releasing said timer for actuation by said delayed operating means, whereby to start said timed operation.

2. Apparatus as defined in claim 1, wherein said trigger element responsive means comprises a linking relay including a first switch for completing a circuit to said electro-magnetic setting means of the timer upon energization of said linking relay, and including a second switch for setting up a holding circuit to itself to maintain its energization, said timer including a normally closed limit switch providing a connection in parallel with said second switch of the linking relay for restoring power to said linking relay at the end of said timed operation, the circuit to said linking switch being broken by said trigger element in response to the arrival of a container at the sealing station causing said linking relay to return to a normal position in which the circuit to said electro-magnetic means is broken to start said timed operation.

3. Apparatus as defined in claim 2, wherein said trigger element is a photoelectric cell, and including a thyratron in a circuit between said photoelectric cell and the energizing circuit of said linking relay, adapted to be fired by the energization of said photoelectric cell, in order to reverse said linking relay from its normal position to its position in which it effects the setting of said timer relay; and means for projecting a light beam upon said photoelectric cell through said sealing station, whereby the arrival of a container at said sealing station will interrupt said light beam, deenergize said photoelectric cell and cause the arc in said thyratron to be extinguished so as to cause said linking relay to return to its normal position, thereby releasing said timer relay for its timed operation.

4. Apparatus as defined in claim 3, wherein said first switch of the linking relay has a normally closed position in which it completes the circuit through said jaw control switch of the timer, to start the jaw closing operation upon reversal of said linking relay back to normal position in response to interruption of said light beam.

5. Apparatus for sealing tubular containers of flexible thermoplastic material, comprising: means for supporting a series of filled containers on vertical axes with open ends projecting upwardly, and for transporting said containers from a filling position to a sealing position; a sealing head having clamping jaws movable in a horizontal path transverse to the path of container transporting movement, from horizontally spaced open to closed positions for clamping between them the open end of a container and closing the same; means for applying heat to said container end as thus closed, for forming a closure seam; said jaws having respective vertical, tube-engaging faces extending horizontally to embrace the upper end of a tube to be sealed, one of said jaws having a bearing face disposed in a horizontal plane intersecting the other tube-engaging face between its upper and lower margin, said other tube-engaging face being extended vertically beyond said plane to support the tube for trimming immediately along the margin of the sealed area; a trimming knife slidably mounted upon said bearing face in a position to engage said seam against the tube-engaging face of said other jaw and to trim away the flash margin of said seam; and means for closing said jaws and for advancing said knife for said trimming operation while the jaws are closed.

6. Apparatus as defined in claim 5, wherein said last mentioned means comprises a pair of pneumatic actuators, the actuator for said shear knife being carried by said one jaw and being linked to one end of said knife, the other end of said knife being pivoted to said one jaw.

7. Apparatus as defined in claim 5, wherein said heating means comprises electrodes carried by said jaws and providing the container engaging surfaces thereof, and means for generating and applying to said electrodes and transmitting between said electrodes and through said container end, high frequency electric pulses adapted to generate welding heat in the container material.

8. Apparatus as defined in claim 5, wherein said heating means comprises electrodes carried by said jaws and providing the container engaging surfaces thereof, and means for generating and applying to said electrodes and transmitting between said electrodes and through said container end, high frequency electric pulses adapted to generate welding heat in the container material and including an intermittently rotatable turret having a series of circumferentially spaced sockets for supporting containers in upright positions with their open ends projecting thereabove, said turret being positioned to bring said containers successively to a sealing station between said jaws.

9. Apparatus as defined in claim 5, wherein said heating means comprises electrodes carried by said jaws and providing the container engaging surfaces thereof, and means for generating and applying to said electrodes and transmitting between said electrodes and through said container end, high frequency electric pulses adapted to generate welding heat in the container material and including an intermittently rotatable turrent having a series of circumferentially spaced sockets for supporting containers in upright positions with their open ends projecting above, said turrent being positioned to bring said containers successively to a sealing station between said jaws and further including means for projecting a light beam through said sealing station; a photoelectric cell positioned to receive said light beam when not interrupted by a container at said sealing station; and control means automatically operable, reponse to interruption of said light beam, to cause said jaw and shear actuating means and said generating means to automatically operate in sequence to close said jaws while applying heating current thereto and to then effect said shearing operation.

10. Apparatus as defined in claim 5, wherein said heating means comprises electrodes carried by said jaws and providing the container engaging surfaces thereof, and means for generating and applying to said electrodes and transmitting between said electrodes and through said container end, high frequency electric pulses adapted to generate welding heat in the container material and including an intermittently rotatable turrent having a series of circumferentially spaced sockets for supporting containers in upright positions with their open ends projecting thereabove, said turret being positioned to bring said containers successively to a sealing station between said jaws and further including means for projecting a light beam through said sealing station; a photoelectric cell positioned to receive said light beam when not interrupted by a container at said sealing station; and control means automatically operable, in response to interruption of said light beam, to cause said jaw and shear actuating means and said generating means to automatically operate in sequence to close said jaws while applying heating current thereto and to then effect said shearing operation; means for directing an air jet between said jaws and against said seam; and means for controlling said air jet to start the same after said jaws have been closed and to continue the same until after said shearing operation is completed.

11. Apparatus for sealing tubular containers of flexible thermoplastic material, comprising: means for supporting a series of containers in vertical positions with open upper ends; means for moving said supporting means intermittently to transport the containers between a filling station and a sealing station; a sealing head at said sealing station having clamping jaws movable transversely to the path of container transporting movement, between an open position in which the jaws are in horizontally spaced straddling relation to the open end of a container at the sealing station, and a closed position in which said open end is clamped between them and thereby closed; means for transmitting between said jaws and through said container end as thus closed, high frequency electric impulses for heat sealing said closed end to provide a closure seam; said jaws having respective vertical, tube-engaging faces extending horizontally to embrace the upper end of a tube to be sealed, one of said jaws having a bearing face disposed in a horizontal plane intersecting the other tube engaging face between its upper and lower margin, said other tube-engaging face being extended vertically beyond said plane to support the tube for trimming immediately along the margin of the sealed area; a trimming knife slidably mounted upon said bearing face in a position to engage said seam against said other tube-engaging face and to trim away the flash margin of said seam; actuators for closing said jaws and for advancing said knife respectively; and control means for sequentially activating the respective actuators for first closing said jaws, effecting said sealing, and then actuating said shear.

12. Apparatus as defined in claim 11, including control means responsive to the arrival of a container at said sealing station for sequentially effecting said jaw closing, sealing and shearing steps.

13. Apparatus as defined in claim 12, wherein said responsive means comprises means for projecting a light beam through said sealing station; a photosensitive element ararnged to be energized by said light beam; and control means responsive to a signal developed by said photosensitive element, adapted to initiate a cycle of said sequential operation.

14. Apparatus as defined in claim 13, wherein said responsive means further includes a linking relay controlled by said photosensitive element; and a timer arranged to be set for the beginning of a timing operation by action of said linking relay in response to energization of said photosensitive element, to be started in said timing operation by reverse action of said linking relay in response to interruption of said light beam by a container at said sealing station, and during said timing operation to govern said sequential operation of the apparatus.

15. Apparatus as defined in claim 14, said linking relay embodying a double throw switch having a normally closed position and a second closed position in which it assumes when energized; a timer embodying electromagnetic means for setting the same in a starting position and means for effecting delayed movement of said timer back to a normal position in a timed operation upon release of said timer by de-energization of said electromagnetic means; and a circuit which is closed by said double throw switch in its said second position, for energizing said electromagnetic means; said timer further embodying a switch that is closed in said starting position and holds said closed position for a jaw-closing interval after said release; and a circuit for energizing said jaw actuator, said last mentioned circuit including said timer switch and said double throw relay switch in the normally position of the latter; said linking relay being adapted, in response to said trigger means upon arrival of a container at said sealing station, to return to its normal position so as to complete said jaw actuator circuit.

References Cited in the file of this patent

UNITED STATES PATENTS

| | | |
|---|---|---|
| 2,539,375 | Snyder | Jan. 23, 1951 |
| 2,638,963 | Frederick et al. | May 19, 1953 |
| 2,640,908 | Welch | June 2, 1953 |
| 2,641,304 | Biddinger | June 9, 1953 |
| 2,650,288 | Bradley et al. | Aug. 25, 1953 |
| 2,682,910 | Piazze | July 6, 1954 |
| 2,751,965 | Miller | June 26, 1956 |
| 2,796,913 | Fener et al. | June 25, 1957 |